April 25, 1939.  E. S. GANDRUD  2,155,538
SURVEYOR'S PLANE TABE
Filed April 19, 1937  2 Sheets-Sheet 2
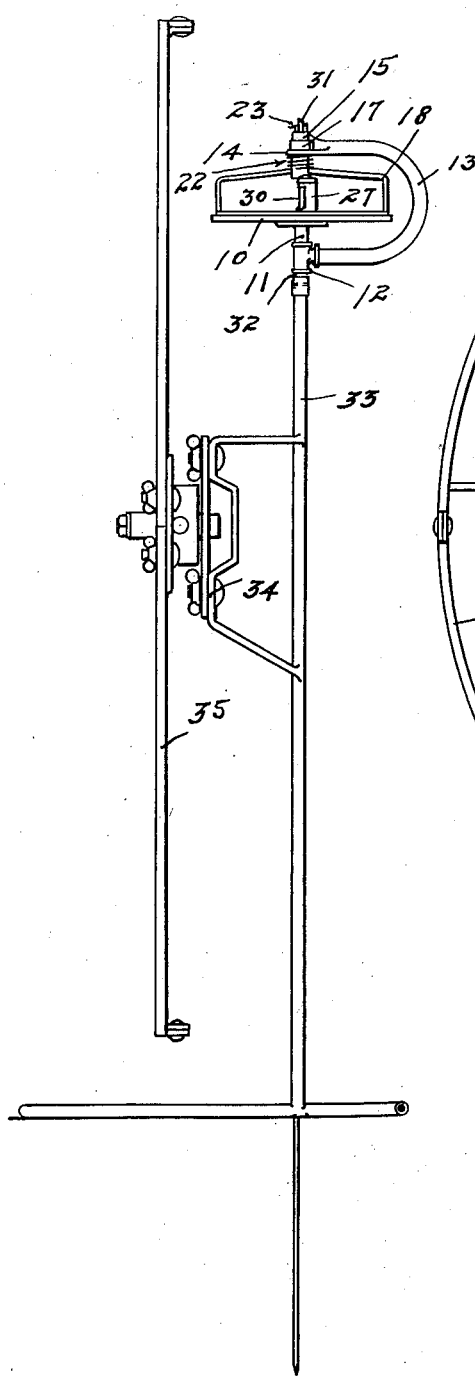
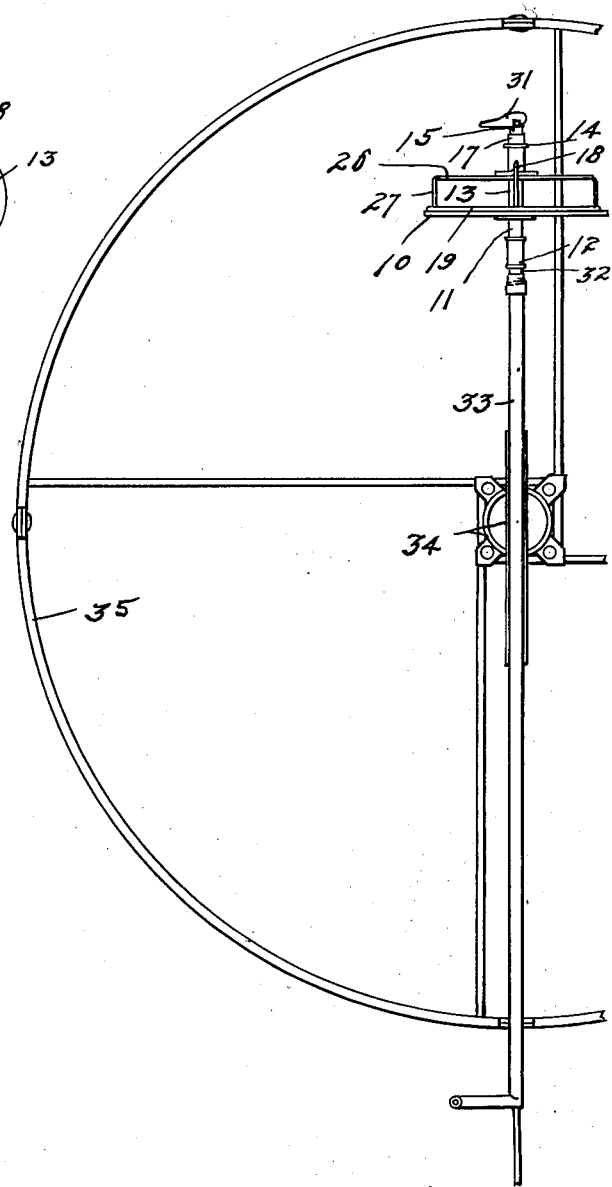
INVENTOR
Ebenhard S. Gandrud
By his Attorneys
Merchant Kilgore Patented Apr. 25, 1939

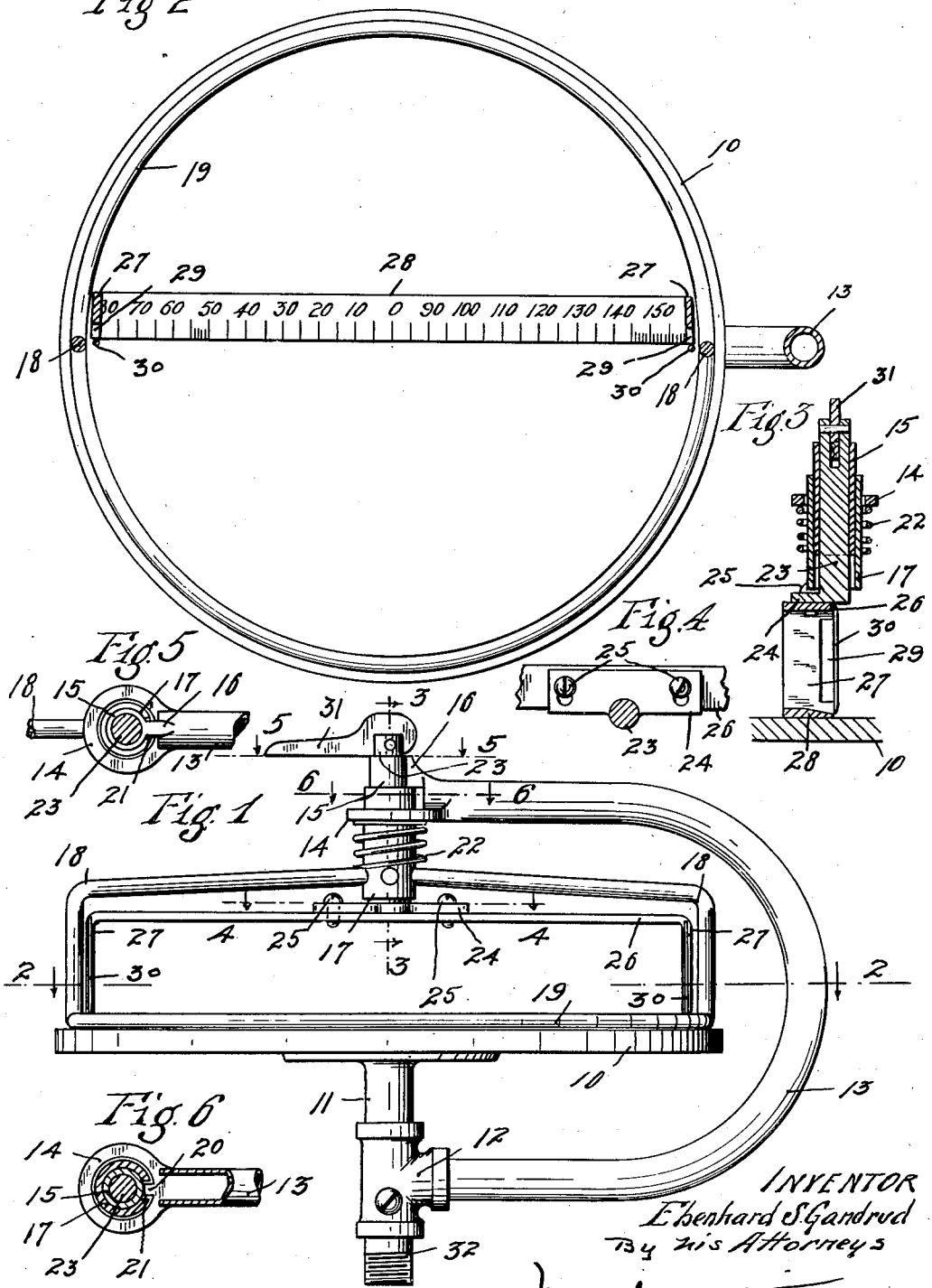

2,155,538

UNITED STATES PATENT OFFICE 2,155,538

SURVEYOR'S PLANE TABLE

Ebenhard S. Gandrud, Pipestone, Minn.

Application April 19, 1937, Serial No. 137,612

16 Claims. (Cl. 33—67)

My present invention provides a very simple and efficient land surveying and plotting instrument of a type wherein a so-called plane table is employed in connection with an alidade including a sighting bar, straightedge and ruler. Generally stated, the invention consists of the novel devices, combinations of devices and arrangement of parts hereinafter described and defined in the claims.

The device, while capable of more general use, has been especially designed and is particularly adapted for use in connection with a "Land measuring instrument" such as that disclosed and claimed in my pending application Serial Number 96,977, filed August 20, 1936. The surveying instrument thus combined with the land measuring instrument is well adapted for use in making quick surveys and plottings for farms and land generally.

A surveying instrument of the plane table type, as generally understood, comprises a drawing table or board, a tripod or other support and a sighting bar or adjustable sighting element. In my improved device the sighting bar or element includes a straightedge or ruler for plotting surveyed lines; and this straightedge is brought into an important relation to the sighting elements and the plane table, as will presently more fully appear. The device also includes simple and efficient means for holding the plotting or charting sheet or paper on the table while the sighting bar and straightedge are being used.

In the accompanying drawings, which illustrate the invention applied to the staff or operating bar of a land measuring wheel, such as that disclosed in my above identified prior application, like characters indicate like parts throughout the several views.

Referring to the drawings:

Fig. 1 is a side elevation showing the surveying instrument proper detached from the staff of the land measuring wheel;

Fig. 2 is a horizontal section taken on the line 2—2 of Fig. 1;

Fig. 3 is a fragmentary section taken on the line 3—3 of Fig. 1;

Fig. 4 is a fragmentary horizontal section taken on the line 4—4 of Fig. 1;

Fig. 5 is a fragmentary horizontal section taken on the line 5—5 of Fig. 1;

Fig. 6 is a fragmentary horizontal section taken on the line 6—6 of Fig. 1;

Fig. 7 is a front elevation showing the surveying instrument applied to the staff of the land measuring wheel; and Fig. 8 is a side elevation of the parts shown in Fig. 7, portions thereof being broken away.

The drawing table or board 10 is preferably a smooth flat-faced disc that is supported by an axially depending stem 11. This stem 11, as shown, is secured by a T-coupling 12 to the lower prong of a U-shaped bracket 13, the upper arm of which is extended over and well above the table and terminates in a head that is made up of a ring-like flange 14 and a sleeve 15. The sleeve 15 extends with clearance downward through the axial flange 14. The common axes of the flange 14 and sleeve 15 are aligned with the common axis of the table 10 and its stem 11. As best shown in Fig. 5, the sleeve 15 is connected to the upper arm of the yoke 13 by a narrow yoke 16. Slidably mounted on the sleeve 15 and working freely through the passage in the flange 14 is an outer sleeve 17 that is provided with diametrically projecting arms 18, the outer ends of which are bent downward and integrally or otherwise rigidly connected to a clamping ring 19 that closely follows and preferably is of but slightly less diameter than the table 10.

To keep the arms 18 always in a vertical plane with the yoke 13 the head of the upper arm of yoke 13 is provided with a vertically extended key or flange 20 that engages a slot 21 in the outer sleeve 17. The key 20 is preferably of the same width as the neck 16 and, in fact, forms a vertical extension thereof. A coil spring 22 that surrounds this outer sleeve 17 and is pressed between the arms 18 and the flange 14, normally holds the clamping ring 19 firmly pressed against the table or against the plotting or charting sheet when the latter has been applied.

Working through the inner or fixed sleeve 15 with freedom for rotary and vertical movements is a plunger-acting stem 23, the lower end of which is provided with a laterally projecting flange 24, see particularly Figs. 1 and 4, that is rigidly but adjustably secured, by slot and screw connections 25, to a sighting bar 26, the ends of which are downwardly extended to afford sighting heads or plates 27 which, in turn, are secured to the ends of a straightedge or ruler 28. The heads 27 are notched at 29 to afford clearer view of sighting wires or strips 30 that span the said notches and are secured to said heads. These wires or sighting strips 30 are accurately located in a vertical plane that is traversed by the common axis of the plunger 23 and sleeves 15 and 17; and here it is important to note that the ruling edge of the straightedge 28 is offset back of the said plane very slightly, to wit: about one half the width of a line that would naturally be drawn by the use of a lead pencil. This latter noted feature is highly important and, in fact, is necessary to cause all of the lines that may be drawn along the straightedge with the straightedge in different angles, to intersect at the above noted common axis. The adjustment provided for by the slot and screw connections 25 or other adjusting means enables the straightedge and the sighting wires 30 to be set accurately in positions stated.

As a means for positively raising and permitting lowering of the clamping ring and of the sighting bar and straightedge I have shown a cam-acting lever 31 pivoted to the bifurcated upper end of the plunger 23 and having a cam action on the upper end of the fixed sleeve 15. When this lever is turned to the position shown in Fig. 1, the clamping ring 19 will be tightly pressed against the charting or plotting sheet and the latter will be firmly held on the table. Here it is important to state, however, that when the spring 22, acting on the arms 18, forces the clamping ring 19 down as far as it will go and into tight engagement with the charting sheet, the lower end of outer sleeve 17 will not quite engage the flange 24 of the sighting bar 26, so that then gravity will press the straightedge 28 only into light engagement with the charting sheet, thereby permitting the straightedge to be freely turned into different angular positions, without moving the paper.

When lever 31 is turned approximately 180° more or less from the position shown in Fig. 1, the clamping ring 19 and the straightedge and the parts movable vertically therewith will be raised above the table, so that a charting sheet may be readily applied or removed from the table.

Referring now to Figs. 7 and 8 it will be noted that the T-coupling 12 is provided with a depending trunnion 32 by which it is detachably secured to the upper end of the staff or operating bar 33 of the land measuring instrument. This staff 33, as shown, is provided with an offset bracket 34, to which a land measuring wheel 35 is journaled. The nature of this land measuring device is fully disclosed in my prior application above identified and, hence, it is not deemed necessary for the purposes of this case to further describe the same except to state that when this wheel is run over the ground, the distance travelled will be automatically recorded on a register operated by rotation of the wheel; and, moreover, the land measuring instrument herein disclosed and claimed is, as already stated, capable of uses in combination with the measuring instrument.

The member 26 is herein designated as the sighting bar because it carries the sighting pieces or elements. The said bar 26 may, of course, take various forms, the important thing being that it carries the sighting elements and serves as a support for the straightedge or rule and is located above the rule, leaving the rule free from obstructions at the axis of rotation of the rule and the sighting bar. In this way the sighting bar, which forms the important element of the alidade, is supported at a point above the table or map surface with freedom for both rotary and vertical movements.

The straightedge, as shown, is provided with graduations that read both ways from zero, zero being the center of the scale and at the common axis of the sighting bar and table. Preferably these graduations are in dimension of rods. The map holder or clamp 19 holds securely that portion of the charting sheet or map on which immediate work is being done and permits free adjustments of the straightedge and sighting bar. The adjustable connection between the straightedge and its support permits adjustments of the former for the use of various sizes of leads. The arrangement also permits the clamping and holding of a long paper sheet, the ends of which may fall down beyond the table and not interfere with the line of vision in the use of the instrument.

The arrangement described permits the sighting bar and ruler, which constitute the chief elements of the alidade, to be turned from a backward sighting to a forward sighting position without lifting the alidade from the map surface. The alidade or sighting bar has its sighting wires or elements arranged for sighting directly in line with the edge of the straightedge or ruler. By reference to Fig. 3 it will be noted that when the clamping ring or rim 19 is tightly pressed against the paper on the table, under the action of spring 22, the lower end of outer sleeve 17 does not quite engage the flange 24 of plunger 23. This arrangement affords means for tightly holding the paper against accidental movement, forces the alidade, consisting of the sighting bar and ruler downward until the ruler has almost reached the table and then leaves the ruler engaged loosely with the paper only under the action of the gravity thereof and of the alidade and plunger. At the time just noted gravity is the only yielding force that holds the ruler actually against the paper.

The device can be used in various different ways, but I have found it very convenient and desirable to use the same in the following manner:

On a farm where acreage is to be determined, the land measuring instrument and land plotting instrument is taken to the field. The wheel is set back to its zero starting point at one corner of the field. The operator rolls the land measuring wheel along one edge of the field until he reaches the second corner. At that point the distance travelled is noted by reading the register on the measuring wheel. The staff is then inserted into the ground with the table in horizontal position. The mapping paper is then inserted underneath the clamping device and the zero line drawn from the zero outward to the reading on the scale that corresponds to the reading on the register. The land mapping device with that line drawn on the map is lined up with the edge of the field just travelled, or more commonly called "back sighting". The sighting bar or alidade is then turned to the next or third corner and a partial line drawn which gives the proper angle. When the third corner is reached and the distance or length of the second side is determined from the wheel register, that line is completed on the scale. The land measuring instrument is then removed from the ground and the operator rolls or guides the land measuring instrument along the second edge of the field to the third corner and goes through the same operation again as above mentioned. This procedure is repeated until the operator reaches the starting point or corner number one. When the work is completed, the operator has a map of the field drawn to scale which will permit readily plotting and determining of acreage contained in said field.

What I claim is:

1. In a device of the kind described, the combination with a table, of a sighting bar with straightedge located above said table, supported on a central axis with the intermediate portion of the straightedge free from obstructions, and mounted for rotary movements over said table and for raising and lowering movements in respect to said table, means tending to press said sighting bar and straightedge downward, combined with means for readily lifting said bar and straightedge.

2. In a device of the kind described, the combination with a table, of a sighting bar with straightedge located above the table, supported for rotation on a central axis with the intermediate portion of said straightedge free from obstructions, and a work clamping ring vertically movable for engagement with the outer portion of said table beyond the ends of said sighting bar.

3. In a device of the kind described, the combination with a table, of a sighting bar with straightedge located above said table, supported on a central axis with the intermediate portion of the straightedge free from obstructions, and mounted for rotary movements over said table and for raising and lowering movements in respect to said table, and a work clamping ring engageable with the outer portion of said table beyond the ends of said sighting bar and straightedge and mounted for vertical movements with said sighting bar and straightedge.

4. In a device of the kind described, the combination with a table, of a yoke-like bracket supporting said table and extended to a point above the central portion thereof and there provided with a head consisting of a perforated flange and an inner sleeve extended with clearance through said flange, an outer sleeve mounted for vertical movements on said inner sleeve, a spring yieldingly pressing said outer sleeve downward, a spindle working through said inner sleeve for independent rotary movements and for simultaneous vertical movements with said outer sleeve, a sighting bar secured to the lower end of said spindle and provided at its ends with sighting means, a straightedge secured to the lower portions of said sighting means for rotation with said sighting bar, arms projecting from said outer sleeve and having downturned ends beyond the ends of said sighting bar, and a clamping ring secured to the lower portions of the downturned ends of said arms for engagement with the outer portion of said table.

5. The structure defined in claim 4 in further combination with a cam lever applied to the upper end of said spindle and engageable with the upper end of said fixed inner sleeve and operative to raise and hold said spindle and outer sleeve and parts carried thereby when turned into one position.

6. In a device of the kind described, the combination with a table, of a bracket supporting the same and extending to a point above the central portion of said table and there provided with a bearing head, of a vertically disposed spindle rotatable in said head, a sighting bar secured to said spindle for rotation therewith and provided at diametrically opposite ends with depending sighting elements, and a straight-edge secured at its ends, to the depending ends of the said sighting elements and arranged to rotate immediately over said table, and which spindle, sighting bar and straightedge are also mounted for vertical axial movements, and yielding means normally pressing said spindle, sighting bar and straightedge downward and the latter against or close to the table or sheet placed thereon.

7. In a device of the kind described, the combination with a table, of a bracket supporting the same and extending to a point above the central portion of said table and there provided with a bearing head, of a vertically disposed spindle rotatable in said head, a sighting bar secured to said spindle for rotation therewith and provided at diametrically opposite ends with depending sighting elements, and a straightedge secured at its ends to the depending ends of the said sighting elements and arranged to rotate immediately over said table, and which spindle, sighting bar and straightedge are also mounted for vertical axial movements, and yielding means normally pressing said spindle, sighting bar and straightedge downward and the latter against or close to the table or sheet placed thereon, and a lock for lifting and releasing said spindle and the parts carried thereby.

8. In a device of the kind described, the combination with a table, of a sighting bar located above said table and mounted for rotary movements on an axial bearing located above said table, said sighting bar having depending sighting elements, spaced on opposite sides of the axis of rotation of said bar, and a straightedge supported at the lower ends of said sighting elements with its central portion free from obstructions, and in further combination with a downwardly pressed sleeve at the axis of rotation of said sighting bar and above the same, said sleeve having radial arms with downturned ends beyond the ends of said sighting bar, and a work clamping ring secured to the downturned ends of said arms and engageable with the table outward of the ends of said sighting bar.

9. In a device of the kind described, the combination with a table, of a bracket supporting the same and extending to a point above the central portion of said table and there provided with a bearing head, of a vertically disposed spindle rotatable in said head, a sighting bar secured to said spindle for rotation therewith and provided at diametrically opposite ends with depending sighting elements, and a straightedge secured at its ends to the depending ends of the said sighting elements and arranged to rotate immediately over said table, and in further combination with a downwardly pressed sleeve surrounding said spindle and having radial arms with downturned ends, and a work clamping ring secured to the lower ends of said radial arms and engageable with the table outward of the ends of said sighting bar and straightedge, and means for simultaneously raising said sighting bar, straightedge and clamping ring.

10. In a device of the kind described, the combination with a table, of a bracket supporting the same and extending to a point above the central portion of said table and there provided with a bearing head, of a vertically disposed spindle rotatable in said head, a sighting bar secured to said spindle for rotation therewith and provided at diametrically opposite ends with depending sighting elements, and a straightedge secured at its ends to the depending ends of the said sighting elements and arranged to rotate immediately over said table, in further combination with a downwardly pressed sleeve surrounding said spindle and having radial arms with downturned ends, and a work clamping ring secured to the lower ends of said radial arms and engageable with the table outward of the ends of said sighting bar and straightedge, and means for simultaneously raising said sighting bar, straightedge and clamping ring, said outer sleeve, radial arms and clamping ring being held from rotation with said arms in the vertical plane of said bracket.

11. In a device of the kind described, the combination with a table, of a bracket supporting the same and extending to a point above the central portion of said table and there provided with a bearing head, of a vertically disposed spindle rotatable in said head, a sighting bar secured to said spindle for rotation therewith and provided at diametrically opposite ends with depending sighting elements, and a straight-edge secured at its ends to the depending ends of the said sighting elements and arranged to rotate immediately over said table, in further combination with a downwardly pressed sleeve surrounding said spindle and having radial arms with downturned ends, and a work clamping ring secured to the lower ends of said radial arms and engageable with the table outward of the ends of said sighting bar and straightedge, and means for simultaneously raising said sighting bar, straightedge and clamping ring, the ruling edge of said straightedge being extended approximately diametrically of a circle struck from the axis of rotation of said rotary parts but offset from such diametrical line approximately one-half the width of a lead mark.

12. In a device of the kind described, the combination with a table, of a bracket supporting the same and extending to a point above the central portion of said table and there provided with a bearing head, of a vertically disposed spindle mounted in said head for rotary movements and vertical adjustments, a sighting bar secured to said spindle for rotation and vertical adjustments therewith and provided at diametrically opposite ends with depending sighting elements, and a straightedge located below said sighting bar and secured thereto, at its ends, to the depending portions of said sighting elements and arranged to rotate immediately over said table.

13. In a device of the kind described, a work table, a clamp located above said work table and positioned for clamping thereto a work sheet or the like, an alidade pivotally mounted above said table and including a straightedge extended diametrically over the face of said table, and means for raising and lowering said clamp so as to set said clamp against the table and to release the same therefrom at will, and a yoke connecting and maintaining said table, clamp and alidade in the cooperative relation stated.

14. The structure defined in claim 13 in which said clamp includes an annular clamping ring and the straightedge of said alidade is contained within the circle of said clamping ring.

15. In a device of the kind described, a work table, a clamp movable vertically toward and from the said table, to clamp and release a work sheet or the like placed on the table, an alidade also mounted above said table and including a straightedge extended diametrically across the table and movable vertically toward and from the table, and means for raising and lowering said clamp and the straightedge of said alidade, in respect to said table, and a yoke connecting and maintaining said table, clamp and alidade in the cooperative relation stated.

16. The structure defined in claim 15 in which said clamp includes an annular clamping ring, and the straightedge of said alidade is contained within the circle of said clamping ring.

EBENHARD S. GANDRUD.